Jan. 26, 1943.  A. R. JOHN  2,309,117
INDICATING SYSTEM
Filed Dec. 9, 1940   5 Sheets-Sheet 4

Patented Jan. 26, 1943

2,309,117

UNITED STATES PATENT OFFICE 2,309,117

INDICATING SYSTEM

Arthur R. John, Dayton, Ohio

Application December 9, 1940, Serial No. 369,273

22 Claims. (Cl. 177—351)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to systems for producing an indication of the position of a movable element.

It is often desirable to provide a means for indicating the position of a movable element at one or more near or remote stations. Such a movable element may be a part of some operating mechanism, or it may be an instrument responsive to a certain condition. The path of motion of such an element may be linear, circular, or of any other configuration, the only requirement for application of the present invention thereto being that the element follow a fixed locus in that part of its travel for which an indication is desired. Instrument mechanisms are most commonly provided with movable elements following either a linear or a circular scale. Where the movable element is actuated by a relatively considerable force, the prior art will provide very satisfactory systems for remote indication. There are instruments, however, such as magnetic compasses and the like, where the actuating force is so small that it cannot be used to operate any mechanism beyond the movable element itself without introducing inaccuracies which would render the system inoperative from a practical standpoint.

The general object, therefore, of the present invention is to provide an improved method and apparatus for indicating the position of a movable element without impeding to the slightest degree the freedom of motion of said element.

A particular object of the invention is to provide an improved remote indicating system for use with a magnetic compass or the like.

A further object is to provide an improved course indicator for vehicles such as airplanes or the like to indicate any deviation from a predetermined set course.

Additional objects and advantages will be apparent as the description proceeds in connection with the accompanying drawings illustrating a number of preferred embodiments of the invention.

In each of the embodiments, a course indicator in the form of a so-called center reading instrument is arranged in a bridge circuit which is balanced when the vehicle is on course. The deflection of the instrument pointer to the right or left of center in response to unbalancing of the bridge circuit serves to indicate the direction and extent of deviation of the vehicle from the set course. The bridge circuit is influenced by energy received through a directional pick-up device cooperating with the movable element whose position is to be indicated, which in the case of a magnetic compass is the rotatable compass card. This energy is transmitted from the movable element to a stationary receiving element, the energy in the illustrated embodiments being in the form of light impulses, which offer no interference with free motion.

The pick-up device may, according to the different modifications, be mounted on the movable element so as to be directional with respect to relatively stationary light sources, or it may be mounted adjacent the movable element so as to be directional with respect to light sources on the movable element. In either case the pick-up device is adapted to receive light or other wave energy and transmit it to the receiving element in such a manner that certain characteristics of the energy are changed with changes in the relative position of the pick-up device and the energy sources to produce the desired response in the bridge circuit. The characteristics of the light impulses to which the circuits of the present embodiments respond are either phase or frequency relationships, but other distinguishable light characteristics such as wave length or polarization may be used. The expression "light impulses" as used herein includes both light flashes interrupted by intervals of darkness and attenuated light variations where the light is never entirely interrupted.

For purpose of illustration, the movable element is herein illustrated as the compass card in a magnetic compass, but it is to be understood that the term movable element is used in its broadest sense to include any type of element having motion of any type as hereinbefore described.

In the drawings:

Fig. 10 illustrates by way of an elevational view with parts broken away an alternative manner of mounting a curved light conductor rod on a compass card or the like.

Figure 1:
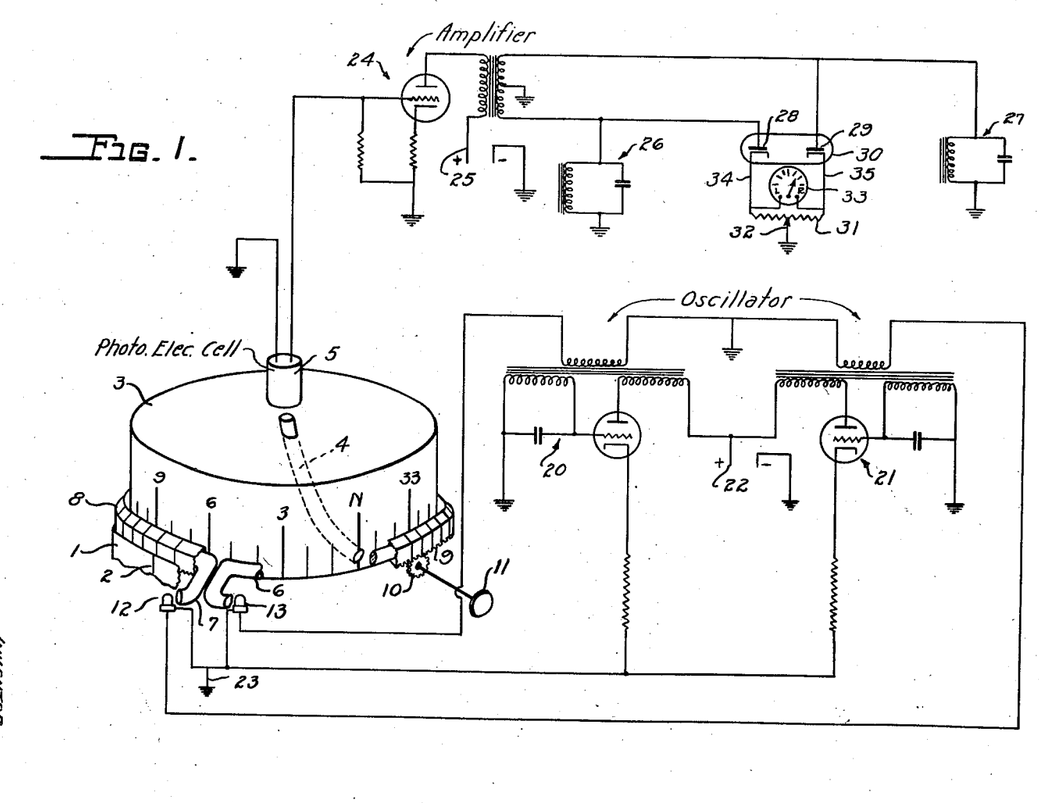
Fig. 1 is a schematic diagram illustrating an embodiment of the invention employing energy radiators producing light impulses of different frequencies in connection with a pick-up device carried on the movable element.

Referring now to the drawings in detail, there is shown in Fig. 1 a remote indicating system employing a movable light pick-up device directional with respect to a pair of light sources which transmit light impulses at different frequencies. The numeral 1 designates a fixed part of a magnetic compass bowl carrying an indicium 2, known as a lubber line, and supporting a pivotally mounted compass card 3. Carried by the compass card 3 is a light conducting rod 4, curved in the manner illustrated for reasons which will become apparent as the description proceeds. The lower end of the light conducting rod 4 is arranged in an opening in the periphery of the compass card so as to be exposed to light emitted around the periphery of the compass card. The upper end of the light conducting rod 4 is directed substantially vertically upwardly above the center of the card directly over the pivot thereof. Supported in a fixed position vertically above the upper end of light rod 4 is a light sensitive device 5 such as a photoelectric cell or the like. The compass card 3, carrying the light rod 4, is free for unrestricted rotation about its pivotal support to give the customary indication of magnetic direction. The eccentric weight of the light rod 4 may be counterbalanced by suitable weight on the opposite side of the compass card.

Arranged in a circle about the skirt of the compass card 3, and in a plane with the lower end of the light rod 4, are a pair of substantially semicircular light conducting rods 6 and 7 carried by the rotatable ring 8. The ring 8 surrounds the compass card so as to carry the light rods 6 and 7 spaced therefrom with just sufficient clearance to allow for the motions of the card. The ring 8 may be provided with a rack 9, engageable by a pinion 10, to be rotated by a thumb screw 11 for angular adjustment of the light rods 6 and 7 to the proper azimuthal position with respect to the lubber line 2. Each of the light rods 6 and 7 extend substantially 180 degrees around the compass card so as to leave substantially no gap at the junction points of the two light rods on the opposite sides of the compass. The adjacent ends of the light rods on one side of the compass are bent outwardly in the manner illustrated in Figure 1, to receive light individually from a pair of light sources 12 and 13, such as neon lamps or the like. The lamps 12 and 13 are carried by the ring 8 in such a manner as to allow for the rotation of the said ring through a complete circle of 360°, the electrical connections for the lamps being established by means of flexible leads or slip rings.

Each of the light conducting rods 4, 6 and 7 has the characteristic property of conducting light energy along the length of the rod, regardless of the shape into which the rod may be bent. These light conducting rods may be made of quartz, or of glass coated on part of the cylindrical surface with black enamel or the like, or they may be formed from any transparent plastic having the light conducting properties of quartz such as a polymerized ester of acylic acid known to the trade as Lucite, Polystyrene, Vinylite, Plexiglass, or the like, either coated or uncoated on the outside surface. The last named materials are particularly suitable for the present use, because they have marked light conducting properties and are light in weight. It will be understood then, that the light sources 12 and 13 are arranged to transmit light energy into the ends of light conducting rods 6 and 7 which will in turn conduct the light energy from the respective sources around the opposite sides of the compass card. Means are provided for causing light to be transmitted in a radial direction towards the compass card throughout the circular length of the light rods 6 and 7. In the present embodiment this means takes the form of a ground or otherwise roughened surface formed on the side of each light rod 6 and 7 facing the compass card. If the cylindrical surface of each light rod is blackened or otherwise rendered non-light emitting, such coating is either omitted or removed from that portion of the surface which is ground or roughened to facilitate light transmission in a radial direction. These ground light emitting surfaces are shown at 46 and 47 in Figure 2 where a tapered construction is used for a purpose hereinafter to be set forth.

For reasons which will become more apparent as the description proceeds, it is desired that the properties of light emission vary progressively along the length of each of the light rods 6 and 7. This may be accomplished in various ways, as for instance by a ground surface, or window, of uniform width throughout the length of the rod if the light conducting properties of the material of which the rod is constructed are such as to materially reduce the intensity of the light from one end of the rod to the other. If the material of the light conducting rods is such that the light intensity does not vary appreciably from one end of the rod to the other, or if it is desired to accentuate or modify the variation in light intensity throughout the length of the rod, the previously mentioned ground portion, or window, facing the compass card may be made of a tapering width, the direction of the taper depending upon the nature of the effect desired. Thus, if it is desired to provide uniform light emission along the rod, the window may be made narrow at the end of the rod near the light source and wider as the distance from the light source increases, to compensate for the light absorption in the material of the rod. If it is desired to provide the greatest illumination near the remote end of the rod, the window may be widened at the remote end beyond the width required to maintain uniform light emission in the manner shown in Figure 2. If it is desired to provide the greatest illumination near the source, the window may be made of uniform width, or the taper may be reversed so that the window will be widest near the source. In the present embodiments it is preferred that the light emission shall increase in a direction away from the source. The spacing of the adjacent portions of the light rods 6 and 7, and the curvature of the bends where these portions depart from semicircular shape is preferably such that light from both rods may be received simultaneously by the light rod 4.

There will then be two positions of the compass card 3, 180 degrees apart, in which light will be received equally from the light rods 6 and 7. Upon a slight deviation of the compass card from either of these positions more light will be received from one of the light rods 6 or 7 than from the other. Upon a great deviation, the light rod 4, and hence the light sensitive device 5, will receive light solely from one of the light rods 6 or 7, as the case may be.

Hereinafter, for convenience, when referring to the respective sources of light, the light rods 6 and 7 may be understood to be included with the neon lamps 12 and 13 as constituting collectively the respective sources of light, the lamp 13 and the light rod 6 thereby constituting one source and lamp 12 and the light rod 7 together constituting the other source.

In the embodiment of Figure 1, the lamps 12 and 13 are energized to emit light impulses at different frequencies. Any type of energy sources which will produce the desired frequencies of light flashes may be used, but for purposes of illustration there are shown a pair of audio oscillator circuits. One oscillation circuit, indicated generally at 20, energizes the neon lamp 13 at a given constant frequency. The other oscillation circuit 21 energizes the other lamp 12 at a constant but different alternating frequency. A common source of electrical supply for both oscillators is shown at 22. A common ground for the oscillation circuits at the lamps is indicated at 23.

A high gain amplifier is indicated generally at 24, connected to photoelectric cell 5, the amplifier circuit being energized by an electrical supply indicated at 25. The numeral 26 indicates generally a tuned circuit resonant to the frequency of one of the oscillation circuits 20, 21, and 27 indicates generally a tuned circuit resonant to the frequency of the other oscillation circuit. These two tuned circuits 26 and 27 are connected to the plates 28 and 29 respectively of a twin diode 30 or other equivalent rectifier system. Associated with the diode 30 is a potentiometer 31 forming therewith a bridge circuit having an adjustable tap 32 connected to ground. A center reading instrument 33 is connected across the bridge in such a manner that a vectorial addition of the plate alternating voltages takes place. The arrangement is such that when one of the tuned circuits 26, 27 responds to the frequency from the oscillation circuit 20, the other tuned circuit is unresponsive thereto, causing a deflection of the indicator in the instrument 33 to the right as illustrated. This condition corresponds to a considerable shift of the ring 8 to the right, or in a clockwise direction, such as would occur if the ship or vehicle, were turning to the right of the set course. If the deviation were to the left, and of a considerable magnitude, it is evident that the light rod 4 would pick up the frequency from the light source 7, 12, generated by the oscillation circuit 21, which would create a condition of resonance in the other tuned circuit, causing the indicator in the instrument 33 to indicate a left turn, the tuned circuit which responded to oscillator 20 now being relatively unresponsive and inactive.

It will be remembered that the lubber line 2 is a stationary mark aligned with the axis of the ship or vehicle and that the compass card 3 rotates freely in the normal manner of the movable element of a magnetic compass, or the like. The pilot may set the desired course on the graduated ring 8, with reference to the lubber line 2, and alter the ship's course until the instrument 33 indicates an "on course" position. This "on course" indication, or center position of the indicator in the instrument 33, results when the light rod 4 is receiving light equally from the light conducting rods 6 and 7, in which case both of the tuned circuits 26 and 27 will respond equally to the oscillators 20 and 21, resulting in a balanced condition in the branches 34 and 35 of the bridge circuit. The ground connection 32 on the potentiometer 31 is adjusted so that a balance will result under these conditions. Upon a slight deviation of the ship or vehicle from the set course, the light-responsive device 5 will receive more light from one of the light rods 6 or 7, than from the other. When this occurs the signal strength in one of the tuned circuits 26, 27 will be stronger than in the other, producing a slight movement of the indicator to the left or to the right as the case may be. If the deviation of the ship or vehicle from the set course becomes greater the only signal received through the amplifier 24 will be the one corresponding to the particular light rod opposite the light rod, or pick-up device 4 which is, in the case illustrated, the light rod 6 energized from the oscillator 20. To cause the indicator in the instrument 33 to move through a greater amplitude with increasing deviation from the set course, the light rods 6 and 7 are constructed in a manner previously described, to increase the response in the light sensitive device 5 as the light rod 4 travels relatively to the light rod 6 or 7 in a direction away from the "on course" position.

It will be seen that an erroneous "on course" reading may be obtained by the instrument 33 when the compass card 3 has rotated to a position 180 degrees from the set course. This condition will occur when the lower end of the light rod 4 has rotated to a point opposite the remote adjacent ends of the light rods 6 and 7, on the far side of the ring 8, as viewed in Figure 1. This position, however, will not be readily confused with the true "on course" position, inasmuch as a slight deviation will cause the indicator in the instrument 33 to swing through a large amplitude, whereas a slight deviation from the "on course" position will cause only a slight swing of the indicator, due to the attenuation characteristics along the light rods 6 and 7, whereby the light sensitive device 5 is caused to respond to a greater volume of light as the position of the light rod 4 recedes from the sources 12, 13.

Figure 2:
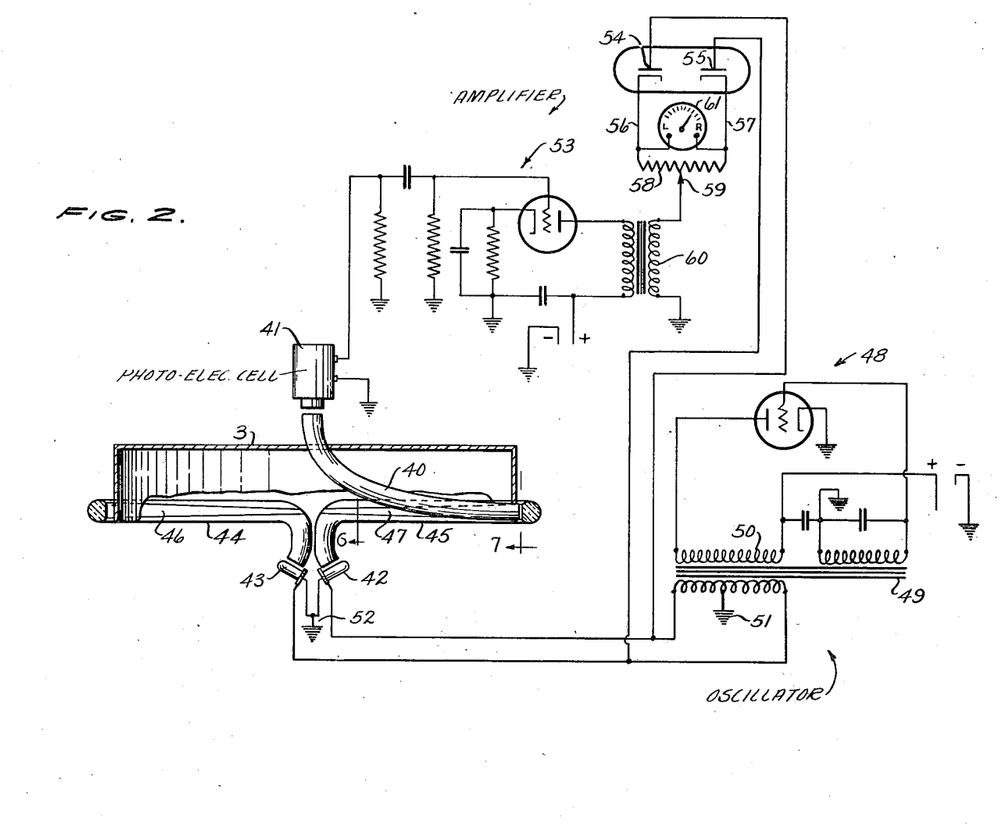
Fig. 2 is a schematic diagram illustrating a modification in which the light impulses differ in phase, rather than frequency.
Figure 6:
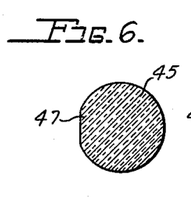
Figs. 6 and 7 are sectional views taken on the lines 6—6 and 7—7 of Fig. 2.

In Figure 2 is illustrated schematically a modification of the invention similar to Figure 1, but providing light impulses on opposite sides of the compass card differing in phase rather than frequency. The light conducting rod 40 is understood to be mounted on a movable element 3 in a manner similar to the rod 4 on the movable element 3, in the magnetic compass of Figure 1. The light responsive device 41 receives light from the light conducting rod 40 in various positions of the latter, in a manner similar to the action of the light sensitive element 5. Light sources 42 and 43 provide illumination for the light rods 44 and 45 respectively. In Figure 2, the light rods 44 and 45 may each be semi-circular, and mounted as in the embodiment of Figure 1, the showing in Figure 2 being a development of the circle to illustrate the tapering light window or ground light emitting portion. If the movement of the movable element were linear rather than circular, the light rods 44 and 45 could be arranged in linear form, in which case they would be positioned to lie in the path of the light receiving end of the light rod 40 carried on the movable element. The tapering light windows through which light is emitted to the end of the light conducting rod 40 are indicated at 46 and 47, being of wedge shape in this embodiment to produce an increasing response in the light sensitive device 41 as the light conducting rod 40 moves in either direction away from the adjacent ends of the rods 44 and 45. The manner in which the light rod 45 is formed to provide a window of varying width is further illustrated in the sectional views shown in Figures 6 and 7. The light conducting rod 44 is symmetrically identical to the rod 45.

The spacing of the adjacent ends of the rods 44 and 45 may be such as to accommodate the light receiving end of the light rod 40 therebetween without receiving light from either of the windows 46 and 47. The spacing in this case would be such that a very slight motion, in either direction, of the movable member carrying the light rod 40 would admit light from one or the other of the windows 46, 47, to produce a response in the light sensitive device 41. It is preferred, however, as in the previous embodiment, to bring the windows 46 and 47 sufficiently close together so that the light rod 40 will receive light equally from both windows 46 and 47 when the movable element is resting in the desired or "on course," position. It is understood that the light rods 40, 44 and 45 are constructed and arranged the same as the light rods 4, 6 and 7, in Figure 1.

In the embodiment of Figure 2, the light sources 42 and 43 are energized from a single constant frequency source of energy with a phase difference of 180 degrees existing between the light impulses in the two sources. The energy source may comprise any known alternating current source, an audio oscillator circuit indicated generally at 48 being used for purpose of illustration. The oscillator 48 includes a transformer 49 having a secondary 50 to energize the light sources. By reason of a center tap 51 and the central ground connection 52 between the light sources, it will be seen that the light impulses in the source 42 will be generated 180 degrees out of phase with those in the source 43.

The numeral 53 indicates generally a high gain amplifier for the output of the light sensitive device 41. Plates 54 and 55 in a twin diode or other equivalent rectifier, such as a copper oxide rectifier, are connected to opposite phase leads from the transformer secondary 50, or from a separate secondary winding, and are in the branches 56 and 57 of a bridge circuit, including the potentiometer 58. An adjustable tap 59, to secure an initial balance, connects the other side of the bridge to ground through one winding of a coupling transformer 60. A meter 61 is connected across the bridge to give a center reading when the bridge is balanced.

The original alternating voltage to the two light sources is fed to the two plates 54 and 55 of the twin diode, so that a vectorial addition of the plate alternating voltages to the cathode alternating voltages takes place. If the voltages in both branches 56 and 57 remain balanced when vectorially added to the rectified plate voltages the bridge will be balanced. If a phase unbalance exists, the meter 61 will be affected by the current from the resulting voltage unbalance, and will tend to assume a position corresponding to the amount of the bridge unbalance to indicate a deviation of the light conducting rod 40, either to the right or to the left of the juncture between the light conducting rods 44 and 45. The meter may be calibrated to indicate this deviation in degrees.

Figures 3, 4, 5:
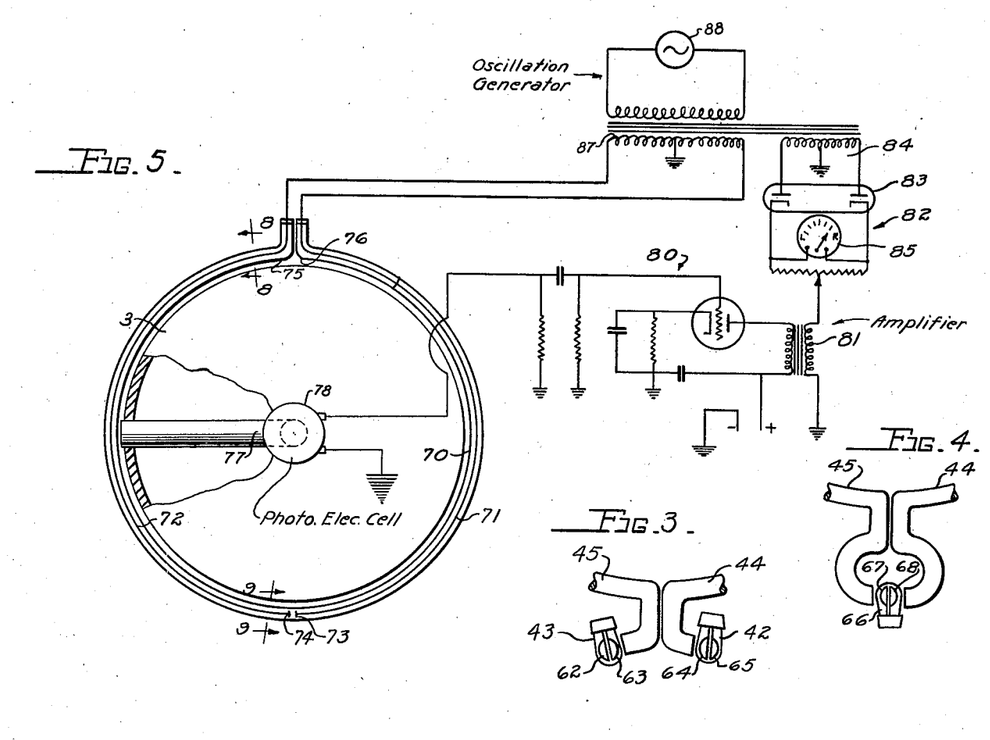
Fig. 3 is an enlarged fragmentary view of the light sources shown in Figs. 1 and 2.
Fig. 4 is a view similar to Fig. 3, showing a modified arrangement for the sources of illumination.
Fig. 5 illustrates a system similar to the system in Fig. 2, but employing a special gaseous discharge tube as the sources of phased light impulses.

The arrangement of the light sources adjacent the ends of the semi-circular light conducting rods is illustrated in detail in Figure 3. The light sources are preferably small neon lamps each having a pair of electrodes therein, as shown at 62, 63 and 64, 65. The lamps 42 and 43 are turned so that only the light from a single electrode is allowed to enter each one of the light rods 44 and 45. As shown in Figure 3, the electrodes 63 in the lamp 43 supplies the light for the light rod 45, and the electrode 64 in the lamp 42 supplies the light for the light rod 44. The remaining electrodes 62 and 65 are thus shielded so that substantially no light therefrom will enter the light rods. A characteristic of neon lamps of this type is that when energized with a sufficient alternating potential the electrodes will glow alternately on alternate half cycles of the wave form; hence during half of each alternating current cycle the light rod 44 will receive illumination from electrode 64 which will be luminous at that time. Electrode 62 will be luminous simultaneously with the electrode 64, but, since it is shielded by the electrode 63, will produce no effect in the system. During the half wave just mentioned, the electrodes 63 and 65 will be dark. On the next half wave, electrodes 63 and 65 will glow, and the electrodes 62 and 64 will be dark. At this time the light rod 44 will not be illuminated, since it cannot receive light from the electrode 65, but the light rod 45 will be illuminated from the electrode 63.

This explanation of Figure 3 has been applied specifically to the embodiment of Figure 2, but it applies also to the embodiment of Figure 1, wherein the two neon lamps emit light flashes of different frequencies. In Figure 1, however, the lamps may, if desired, be turned in their bases to any fixed position since there is no critical phase relationship to be obtained. For instance, if the lamps 12 and 13 in Figure 1 were arranged in the same manner as the lamps 42 and 43 in Figure 3, each of the light rods 6 and 7 would obviously be illuminated by periodic flashes, and at frequencies equal to the frequencies of the respective oscillation circuits 20 and 21. The necessity for a second oscillation circuit in Figure 1 might be obviated by turning one of the lamps at right angles to the position illustrated in Figure 3 so that one of the light rods would be illuminated by impulses from both the positive and negative parts of the wave form. In this manner both of the lamps may be illuminated from a single frequency source resulting in light flashes of the source frequency in one light rod and light flashes of double the source frequency in the other light rod.

In each of Figures 1 and 2, filament lamps may be substituted for gaseous discharge lamps, provided low frequencies are used. The light impulses would then consist of a modulation effect at source frequency, rather than of a chain of separate flashes. The modulation could be increased by the use of rectifiers, which, in the circuit of Fig. 2, would provide the desired phase displacement between the two lamps.

Figure 4 illustrates an alternative manner of illuminating the light rods 44 and 45 in the system of Figure 2, employing phased light impulses of the same frequency. In this case a single neon lamp 66 is located between adjacent ends of the light rods 44 and 45 in such a manner that the electrode 67 illuminates the light rod 45 and the electrode 68 illuminates the light rod 44, each electrode shielding the adjacent light rod from the other electrode. If the lamp 66 be connected across an alternating potential, the electrodes 67 and 68 will glow alternately at the source frequency, illuminating the light rods 44 and 45 with light flashes of 180 degrees phase displacement. That is to say that if, for instance, the electrode 67 glows on the positive part of the wave, the electrode 68 will be dark at that time; and then during the negative part of the wave the electrode 68 will glow and the electrode 67 will be dark.

It is to be understood that the ring 8 may, if desired, be graduated so as to establish the "on course" point on the far side of the circle from the neon lamps, where the semicircular light conducting rods again become adjacent to each other.

The modification shown in Figure 5 is, in general, similar to the phase displacement system shown in Figure 2. The light source in Figure 5, however, comprises a single neon tube or the like 70, disposed in a circle completely surrounding the movable element 3, if the movable element be one which moves in a circular path such as a compass card or other pivotal instrument. The tube 70 encloses a pair of elongated electrodes 71 and 72 which are provided with plate-like tips 73 and 74, forming an electrical gap at the midpoint of the tube, 180 degrees around the circle from the adjacent ends 75 and 76. The electrodes are energized from any convenient source of alternating potential, which in the present instance is embodied in the winding 87, coupled with an oscillation generator 88. Upon one-half of the alternating wave, one of the electrodes 71 or 72 will glow with an attenuated luminosity extending back to the end 75 or 76 of the tube, the other half of the tube and its electrode remaining dark. Upon reversal of the current, the dark electrode becomes bright and the bright electrode becomes dark, thereby producing light impulses 180 degrees out of phase in the two halves of the neon tube, similar to the action described in the neon lamp 66 in Figure 4. By properly adjusting the size of the tube 70 with respect to the gas pressure and the voltage, the electrodes 71 and 72 may be caused alternately to glow around to their bases at the ends 75 and 76 of the tube.

If there is found to be a tendency for the glow to disappear without traveling back the electrodes as far as the points 75 and 76, the luminous range may be extended by providing a capacity to ground around a part or all of the length of the tube 70. It is understood that the tube 70 is carried in a movable ring similar to the ring 8 in Figure 1, when applied to a conventional type of instrument, so that by making the ring 8 or the casing 1, or both, of metal and grounding these parts, the desired capacity effect may be obtained.

In operation the embodiment shown in Figure 5 is similar to the embodiment in Figure 2. A light rod 77 carried by the movable member 3, transmits light to a photoelectric device 78, mounted in a stationary position aligned with the pivotal axis of the movable member. The end portions 75 and 76 are preferably brought closely together so as to make it possible for light from both electrodes 71 and 72 to enter the light rod 77 when the latter is directed toward the region 75, 76. If desired, the ends 75 and 76 may be spaced so as to produce, in one position of the movable member, a null effect in the light sensitive device 78. It is preferred that movement of the light rod 77 in either direction away from the region 75, 76 will produce an increasing response in the light sensitive device 78. If the light attenuation between the points 74 and 75, and between 73 and 76 is not great enough, the desired variation in light emission may be enhanced by painting the tube so as to leave a window which will produce the desired effect. For instance, windows comprising unpainted areas may be provided in the general form of the windows 46 and 47 shown in Figure 2. By the use of paint on the tube 70, the light variation may be made geometric, logarithmic, exponential, or otherwise, as desired.

Figures 7, 8, 9:
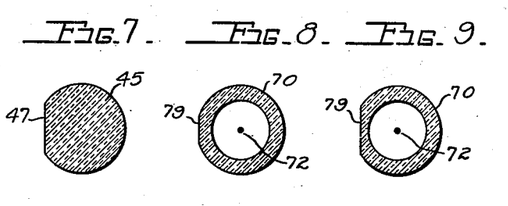
Figs. 8 and 9 are sectional views taken on the lines 8—8 and 9—9 of Fig. 5.

This window may also be formed by flattening and roughening one side of the tube 70, as shown in 79 in Figures 8 and 9, in the manner previously described in connection with Figures 1 and 2. In Figures 8 and 9, the window, or flattened portion 79, is shown to be of greater width in that part of the ring remote from the ends 75 and 76, to increase the response of the light sensitive device 78 as the light rod 77 travels away from the ends 75, 76. The tube 70 is symmetrical with an imaginary diameter drawn between the ends 75 and 76 on one side of the circle, and between the electrodes tips 73, 74 on the other side of the circle.

In Figure 5, a high gain voltage amplifier 80 is provided, corresponding to the amplifier system 53 in Figure 2. The output from this amplifier is coupled by means of transformer 81 to a bridge circuit 82 which includes a twin diode tube 83 fed by a winding 84 inductively coupled with the source of alternating energy 88. The bridge circuit 82 operates in the same manner as the bridge circuit disclosed in Figure 2 to cause an instrument 85 to give a center reading when the bridge is balanced, and to indicate by left and right readings the phase relationship between the coupling 81 and the two phases introduced into the bridge through the winding 84. The amplitude of the left or right indication in the instrument 85 is governed by the angular deviation of the light rod 77 from the region 75, 76, at the ends of the tube 70, by virtue of the light attenuation characteristics of the tube 70 as previously described.

Gaseous discharge tube 70 has been described for the purposes of illustration as a neon tube, but other gases may be used, such as argon, helium, krypton or mercury vapor with satisfactory results, the prime requirement being that the tube emit phased light flashes in the two halves thereof.

Figure 10:
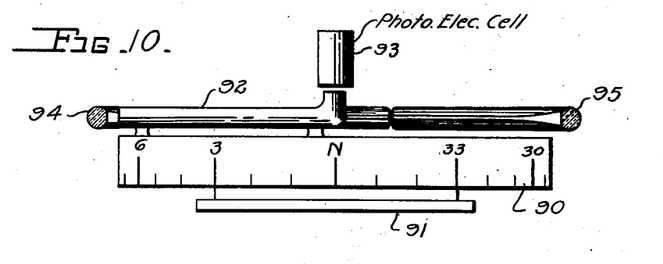

Figure 10 illustrates an alternative manner of mounting the curved light conducting rod on the movable element where the movable element is in the form of a compass card, or the like, in a magnetic compass. In this case the light conducting rod is of extremely light weight material so that it may be supported directly on top of the compass card instead of being caused to extend through an opening in one side of the skirt of the card as shown in Figure 1. The pivotally mounted compass card 90 carries one or more magnets 91 suspended therebeneath in the conventional manner, with the curved light conducting rod 92 being mounted on the top surface of the card. As in Figure 1, a light sensitive device 93 is fixedly mounted in alignment with the axis of the compass and directly above the upturned inner end of the light conducting rod 92. Semicircular light sources 94, 95 surround the periphery of the card in the plane of rotation of the light conducting rod 92, and are spaced therefrom just sufficiently to allow for the oscillating movements of the compass card. The light sources 94 and 95 are understood to be either of the type shown at 6 and 7 in Figure 1, comprising solid rods of light conducting material, or of the type illustrated at 70 in Figure 5, comprising a single gaseous discharge tube.

Figure 11:
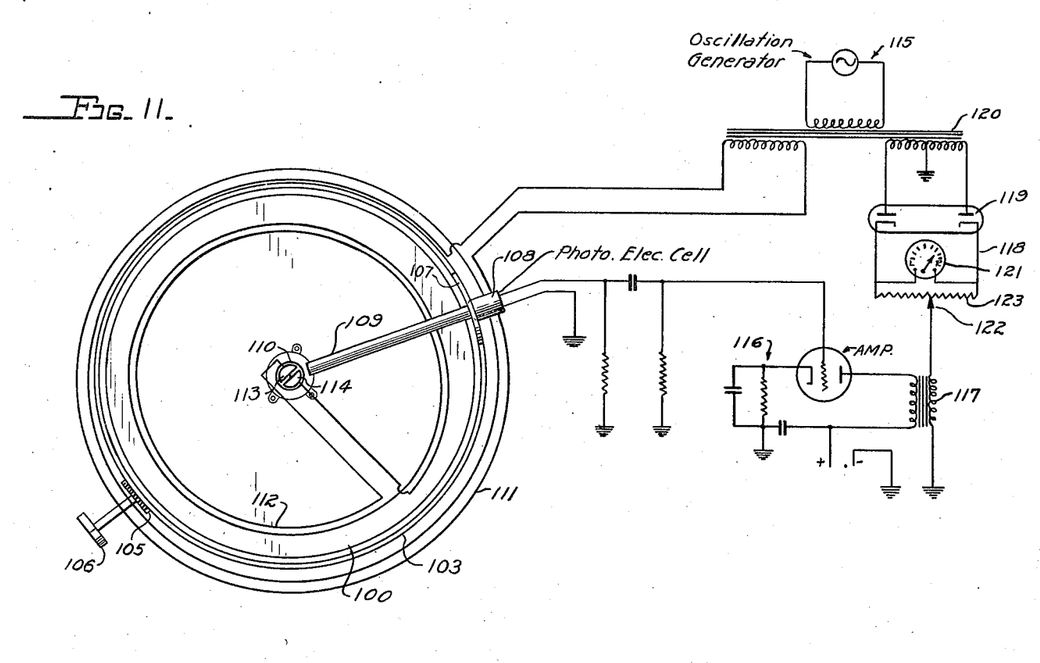
Fig. 11 is a schematic diagram illustrating another embodiment of the invention in which the pick-up device is directional with respect to light sources mounted on the movable element.
Figure 12:
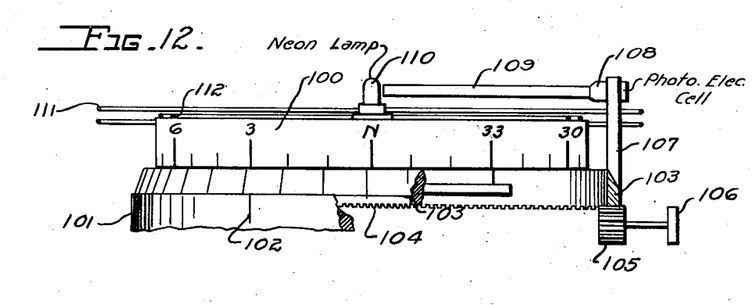
Fig. 12 is an elevation view, with parts broken away, showing in greater detail the manner in which the system of Fig. 11 may be applied to a magnetic compass.

Figures 11 and 12 illustrate still another embodiment of the invention in which the light pickup device is relatively stationary and receives light from a pair of rotatable light sources mounted on a movable element. The compass card 100 is mounted for rotation in the conventional manner within a stationary casing 101 carrying the customary lubber line 102. Surrounding the skirt of the compass card 100, and spaced therefrom sufficiently to allow for oscillating movements of the latter, is a graduated annular ring 103 carrying teeth 104 for engagement with the pinion 105 operated by a thumb screw 106. The ring 103 is adapted for angular adjustment through 360 degrees and carries a standard 107 for supporting a light sensitive device 108. Slip rings or flexible leads may be provided to establish electrical connection with the device 108. The light sensitive device 108 is provided with a directional light conducting rod or tube 109 having the characteristic of excluding all light from the light sensitive device 108 except that which is received through the outer end of the light conducting rod. Centrally mounted on the compass card 100 is the dual light source 110, positioned closely adjacent the end of the light conducting rod 109.

Surrounding the compass card is a primary helix 111, comprising one or more turns of wire. A secondary helix 112, comprising one or more turns of wire, is mounted on the compass card in the manner illustrated, to energize the light source 110. In the present embodiment, the light source 110 comprises a small neon lamp having therein electrodes 113 and 114. An oscillation generator indicated generally at 115 is used to energize the primary helix 111, which in turn transfers energy by induction to the secondary helix 112, for causing constant frequency light impulses, or flashes, from the electrodes 113, 114, in the manner previously described. If, for instance, the electrode 113 becomes luminous during the positive half of the cycle, electrode 114 will then be dark, and in the negative half of the cycle the electrode 113 will be dark and electrode 114 will become luminous.

When the compass card 100 is oriented to the position shown in Figure 11, with respect to the light conducting rod 109, it will be seen that the light sensitive device 108 will receive light predominantly from the electrode 114, inasmuch as the electrode 114 shields a portion of the electrode 113. If the compass card should rotate in a counterclockwise direction, the light received in the light sensitive device 108 would come substantially entirely from the electrode 114, whereas, if the compass card should rotate a few degrees in a clockwise direction the device 108 would receive light substantially equally from the two electrodes 113, 114.

The output of the light sensitive device 108 is fed into a voltage amplifier circuit indicated generally at 116, the output of which is in turn coupled through transformer 117 with a bridge circuit 118, including a twin diode tube 119 the plate circuits of which are energized from a transformer 120 associated with power source 115. The bridge circuit 118 functions in the manner described in connection with the previous embodiments, and includes a so-called center reading meter 121 the indicator of which assumes a central position when the bridge circuit is balanced. A variable tap 122 on the potentiometer 123 provides for the initial balancing of the bridge circuit under the condition of equal light reception from both electrodes 113, 114 by the device 108.

The instrument 121 will thus be seen to indicate a balanced condition in the bridge circuit 118 only when the lamp 110 is oriented to a position such that the two light sources 113, 114, equally illuminate the device 108. When the lamp 110 is rotated to a different position, the response of the device 108 as magnified by the amplifier 116 will be greater for one phase than for the other, causing the bridge circuit 118 to become unbalanced and to indicate the extent of the unbalancing by the amount of deflection in the instrument 121. It will be appreciated that the relative rotation takes place between the lamp 110 and the device 108, the presence of decreasing light in device 108 from one electrode, and increasing light from the other electrode, will result in unbalancing the bridge 118 to an increasing extent in favor of the phase corresponding to the predominant light source, whereby the amount of deflection of the indicator of the instrument 121 will show both the direction and extent of deviation of the compass card 100 from the position for which the circuit was balanced. If desired, half the surface of the lamp 110 may be blackened, or otherwise rendered opaque, to limit the operative range to 180 degrees, that is, to a deflection up to 90 degrees on either side of the desired position. If this is not done, spinning of the compass card might result in an "on course" indication in the instrument 121 when the compass card was in fact 180 degrees out of its indicated position. Another way of preventing this error is to mount the lamp 110 in a horizontal position so that the base of the lamp will obstruct the light on one side of the compass card.

The position of the light sensitive device 108 on the graduated ring 103 is coordinated with the angular position of the lamp 110 on the compass card 100, so that the desired course read on the graduations on ring 103 may be set opposite the lubber line 102. When the ship or vehicle is swung so that the lamp 110 illuminates the device 108 equally with both light sources 113 and 114, the ship will be on the desired course and such will be indicated by the central position of the indicator in the instrument 121 in response to the balancing of the bridge circuit.

While a magnetic compass has been used for purposes of illustration, it is to be understood that the invention is not limited thereto, as it may be applied in substantially its illustrated form to any instrument or movable element having pivotal motion, and may be applied by one skilled in the art to other instruments or movable elements having other paths of motion. Other sources of illumination may be substituted for the glow electrodes 113, 114, the prime requirement being that the pair of light sources follow the movement of the movable element in the manner illustrated, and that they be adapted to emit phased light impulses in the manner described. For instance, two individual neon lamps or the like may be used, each presenting but one of its electrodes as an active light source to cooperate with the light sensitive element 108. If two independent light sources are used a two frequency system using the circuit arrangements shown in Figure 1 may be substituted for the present single frequency, phase displacement system.

In the several modifications, some form of invisible radiant energy may be used instead of visible light. Also, it is to be understood that in each of the disclosed embodiments a plurality of indicating instruments may be associated with the bridge circuits to produce an indication of the position of the movable element simultaneously at a plurality of near and remote points. This may be accomplished by connecting several instruments in parallel, or series, and disposing them where convenient.

The invention is thus capable of many modifications. Changes therefore in the construction and arrangement may be made which do not depart from the spirit and scope of the invention as defined in the appended claims.

I claim:

1. A system for indicating the angular relationship of two relatively rotatable elements comprising a directional light pick-up device carried by one of said elements, a first light source in the form of a band of light emitting material carried by the other of said elements and extending arcuately approximately 180° around said one element, a second light source in the form of a band of light emitting material likewise carried by the other of said elements and extending arcuately approximately the remainder of the distance around said one element, means for energizing said first light source to produce periodic light impulses therefrom, and means for energizing said second light source to produce periodic light impulses therefrom out of phase with the light impulses in said first source, said pick-up device having associated therewith phase-responsive means for producing said indication.

2. A system for indicating the angular relationship of two relatively rotatable elements comprising a directional light pick-up device carried by one of said elements, a first light source in the form of a band of light emitting material carried by the other of said elements and extending arcuately approximately 180° around said one element, a second light source in the form of a band of light emitting material likewise carried by the other of said elements and extending arcuately approximately the remainder of the distance around said one element, means for energizing said first light source to produce periodic light impulses having a predetermined frequency, and means for energizing said second light source to produce periodic light impulses having a different frequency from the light impulses in said first source, said pick-up device having associated therewith frequency-responsive means for producing said indication.

3. A system for indicating the positional relationship of two relatively movable elements comprising a light pick-up device carried by one of said elements for operating an indicating instrument, a first elongated light source carried by the other of said elements and extending in one direction along the path of movement of said pick-up device, and a second elongated light source likewise carried by the other of said elements and extending in the opposite direction along the path of movement of said pick-up device, said two elongated sources being arranged in substantially end-to-end relationship and having progressively increasing light producing capacities in directions away from the region of the adjacent ends.

4. A system for indicating the positional relationship of two relatively movable elements comprising a light pick-up device carried by one of said elements for operating an indicating instrument, and an elongated light source carried by the other of said elements and extending along the path of movement of said pick-up device, said light source comprising a roughly cylindrically shaped member of light conducting material having an elongated light emitting surface of varying width on the side of said member facing said pick-up device, the remainder of the surface of said member being substantially non-light-emitting.

5. A system for indicating the positional relationship of two relatively movable elements comprising a light pick-up device carried by one of said elements for operating an indicating instrument, and an elongated light source carried by the other of said elements and extending along the path of movement of said pick-up device, said light source comprising a roughly cylindrically shaped member of light conducting material having an elongated light emitting surface of varying width on the side of said member facing said pick-up device, the remainder of the surface of said member being substantially non-light-emitting, said light-emitting surface comprising a flattened and roughened area.

6. A system for indicating the angular relationship of two relatively rotatable elements comprising a directional light pick-up device carried by one of said elements for operating an indicating instrument, a gaseous discharge tube of approximately circular shape carried by the other of said elements and surrounding said one element so as to supply light for said light pick-up device as the latter follows the motions of said one element, said tube having its ends relatively close together on one side of the circle and having therein a pair of electrodes each extending substantially 180° around the circle so as to leave an electrical gap on the side of the circle opposite said ends.

7. A system for indicating the angular relationship of two relatively movable elements comprising a primary helix carried by one of said elements and surrounding the other of said elements, means for energizing said helix to produce an alternating electromagnetic field, a secondary helix carried by said other element and receiving alternating energy from said primary helix, a pair of light sources carried by said other element and energized from said secondary helix, one of said light sources emitting light only on the positive half of the cycle of said alternating energy and the other of said light sources emitting light only on the negative half of the cycle of said alternating energy, a light pick-up device carried by said one element and adapted to receive light from one or the other, or both, of said sources, depending upon the relative position of said elements, and means associated with said light pick-up device to deflect an indicator in one direction in response to light from one of said sources and in the opposite direction in response to light from the other of said sources.

8. A system for indicating the positional relationship of two relatively movable elements comprising a light transmitting means moving with one of said elements, means associated with the other of said elements for establishing a band of light commencing at the position occupied by said transmitting means when said elements occupy a predetermined position with respect to one another and extending along each path of movement capable of being followed by said transmitting means as said elements move out of said position, means for impressing different modulation characteristics upon the light of each band, a light pick-up device adapted to receive light from said light transmitting means, and means connected with said pick-up device for causing the characteristics of the light received by said device to give an indication of the positional relationship of said elements.

9. An indicating system comprising a reference frame, an element movable with respect to said frame and having a predetermined normal position with respect thereto, light transmitting means carried by said element, means for establishing a band of light commencing at the position occupied by said transmitting means when said element is in its normal position and extending along each path of movement capable of being followed by said transmitting means as said element moves away from normal position, means for impressing different modulation characteristics upon the light of each band, a light pick-up device adapted to receive light from said light transmitting means, an indicating element, and means connected with said pick-up device and said indicating element for causing the characteristics of the light received by said pick-up device to control the direction of deflection of said indicating element.

10. An indicating system comprising a reference frame, an element movable with respect to said frame and having a predetermined normal position with respect thereto, light transmitting means carried by said element, means for establishing a band of light commencing at the position occupied by said transmitting means when said element is in its normal position and extending along each path of movement capable of being followed by said transmitting means as said element moves away from normal position, means for impressing different modulation characteristics upon the light of each band, means for producing a progressively graduated emission of light along the length of each band, a light pick-up device adapted to receive light from said light transmitting means, an indicating element, and means connected with said pick-up device and said indicating element for causing the characteristics and value of the light received by said pick-up device to control the direction and amplitude of deflection of said indicating element.

11. A system for indicating the positional relationship of two relatively movable elements comprising means on one of said elements for establishing two abutting bands of light, means for causing each band of light to pulsate at a different frequency, a light transmitting means on the other of said elements for receiving light from one or the other, or both of said bands, in accordance with the positional relationship of said elements, a light pick-up device adapted to receive light from said light transmitting means, and means connected with said pick-up device for causing the frequency of the light received by said device to give an indication of the positional relationship of said elements.

12. A system for indicating the positional relationship of two relatively movable elements comprising means on one of said elements for establishing two abutting bands of light, means for causing each band of light to pulsate at a different frequency, a light transmitting means on the other of said elements for receiving light from one or the other or both of said bands, in accordance with the positional relationship of said elements, a light pick-up device adapted to receive light from said light transmitting means, an indicating element, and means connected with said pick-up device and said indicating element for causing the frequency of the light received by said pick-up device to control the direction of deflection of said indicating element.

13. A system for indicating the positional relationship of two relatively movable elements comprising means on one of said elements for establishing abutting bands of light of graduated intensity, means for causing each band of light to pulsate at a different frequency, a light transmitting means on the other of said elements for receiving light from one or the other, or both of said bands, in accordance with the positional relationship of said elements, a light pick-up device adapted to receive light from said light transmitting means, an indicating element, and means connected with said pick-up device and said indicating element for causing the frequency and intensity of the light received to control the direction and amplitude of deflection of said indicating element.

14. A system for indicating the positional relationship of two relatively movable elements comprising a source of alternating current supply, means on one of said elements for establishing two abutting fields of light of a predetermined pattern, means for causing each field of light to pulsate in definite phase relationship with respect to said alternating current supply, a light transmitting means on the other of said elements for receiving light from one or the other, or both of said fields, in accordance with the positional relationship of said elements, a light pick-up device adapted to receive light from said light transmitting means, an indicating element, and means connected with said pick-up device and said indicating element for causing the phase relationship existing between the light received by said pick-up device and the alternating current supply to control the direction of deflection of said indicating element.

15. A system for indicating the positional relationship of two relatively movable elements comprising means on one of said elements for establishing two abutting fields of light of a predetermined pattern, means for modulating each field of light with a different modulation characteristic, a light pick-up device on the other of said elements for receiving light from one or the other, or both of said fields in accordance with the positional relationship of said elements, and means connected with said pick-up device for causing the characteristics of the light received by said device to give an indication of the positional relationship of said elements.

16. A system for indicating whether two relatively movable elements occupy a predetermined normal position with respect to one another or whether they are displaced to one side or the other of said normal position, comprising means on one of said elements for establishing two abutting fields of light, means for modulating each field of light with a different modulation characteristic, a light pick-up device mounted on the other of said elements for receiving light from one or the other, or both of said fields, accordingly as said elements occupy a displaced or a normal position, and means, including an analyzing circuit, connected with said pick-up device for causing the characteristics of the light received by said device to give an indication of the normal or displaced position of said elements.

17. A system for indicating the angular relationship of two relatively rotatable elements comprising a light source mounted on one of said elements for establishing two adjoining fields of light each of a semi-circular pattern, means for modulating each field of light with a different modulation characteristic, a photoelectric device mounted on the other of said elements for receiving light from one or the other, or both of said fields, in accordance with the angular relationship of said elements, and an electrical circuit, including said photoelectric device and a meter for causing the characteristics of the light received by said device to produce an indication on said meter of the angular relationship of said elements.

18. A system for indicating the positional relationship of two relatively movable elements comprising a field of alternating energy adjacent said elements, means moving with one of said elements for receiving energy from said field, means connected with said receiving means and moving with said one element for establishing two adjoining fields of light of a predetermined pattern, means for impressing different modulation characteristics on the light of each field, a light pick-up device moving with the other of said elements and adapted to receive light from one or the other, or both of said fields, in accordance with the positional relationship of said elements, and means connected with said pick-up device for causing the characteristics of the light received by said pick-up device to give an indication of the positional relationship of said elements.

19. A system for indicating the positional relationship of two relatively movable elements comprising a source of alternating current supply, a primary coil connected to said alternating current supply and moving with one of said elements, a secondary coil inductively coupled with said primary coil and moving with the other of said elements, means connected with said secondary coil and moving with said other element for establishing two adjoining fields of light of a predetermined pattern, means for causing each field of light to pulsate in a definite phase relationship with respect to said alternating current supply, a light pick-up device moving with said one element and adapted to receive light from one or the other, or both of said fields, in accordance with the positional relationship of said elements, an indicating element, and means connected with said pick-up device and said indicating element for causing the phase relationship existing between the light received by said pick-up device and the alternating current supply to control the direction of deflection of said indicating element.

20. A system for indicating the positional relationship of two relatively movable elements comprising means moving with one of said elements for establishing two adjoining fields of light of a predetermined pattern, means for impressing different modulation characteristics on the light of each field, a light transmitting means moving with the other of said elements for receiving light from one or the other, or both of said fields, in accordance with the positional relationship of said elements, means for shifting said one element with respect to said other element so as to shift the position of said light fields with respect to said transmitting means, a light pick-up device adapted to receive light from said light transmitting means, and means connected with said pick-up device for causing the characteristics of the light received by said device to give an indication of the positional relationship of said elements.

21. A system for indicating the angular relationship of two relatively rotatable elements comprising means on one of said elements for establishing two adjoining fields of light of graduated intensity, means for impressing different modulation characteristics on the light of each field, a light conducting member carried by the other of said elements for receiving light from one or the other, or both of said fields, in accordance with the angular relationship of said elements, means for shifting the position of said one element with respect to said other element so as to shift the position of said light fields with respect to said conducting member, a light pick-up device adapted to receive light from said conducting member, an indicating element, and means connected with said pick-up device and said indicating element for causing the characteristics and value of the light received by said pick-up device to control the direction and amplitude of deflection of said indicating element.

22. A telemetric system for indicating the angular relationship of two relatively rotatable elements comprising a pair of light sources carried by one of said elements for establishing two abutting fields of light of a predetermined pattern, means for impressing different modulation characteristics on the light of each field, a light pick-up device carried by the other of said members for receiving light from one or the other, or both of said fields, in accordance with the angular relationship of said elements, means for adjusting the relative position of said elements so that said pick-up device will receive light equally from both fields when said other element is in a predetermined position, an indicator having a scale and a pointer normally positioned in the center of said scale, and means connected with said pick-up device and said indicator for causing the characteristics of the light received by said pick-up device to produce a deflection of said pointer from its central position in a direction significant of the deviation of said other element from said predetermined position.

ARTHUR R. JOHN.